Patented Nov. 28, 1950

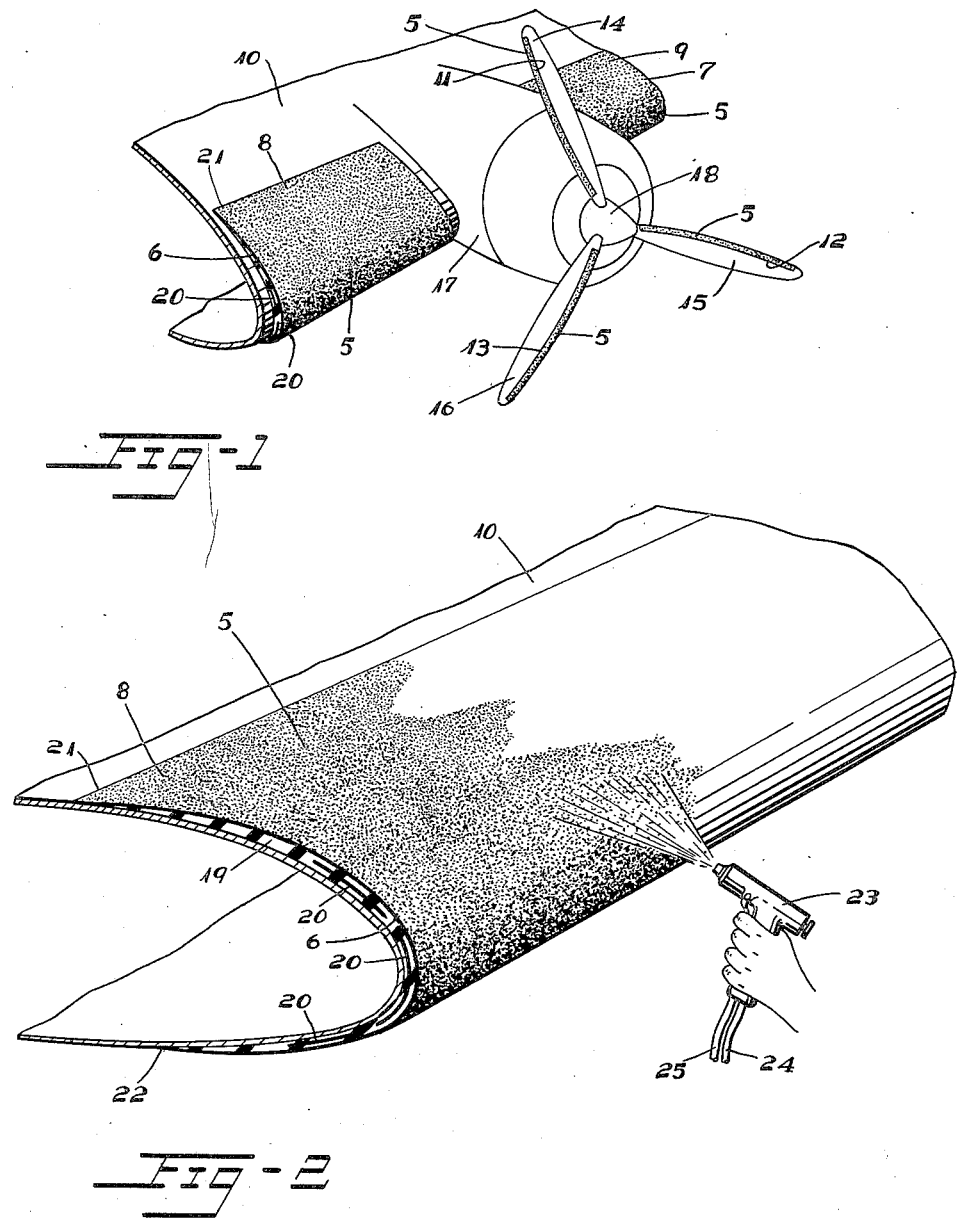

2,531,541

UNITED STATES PATENT OFFICE 2,531,541

SUNLIGHT PROTECTION FOR DISTORTABLE RUBBER SURFACES

Alvin W. Spicer, Cuyahoga Falls, Ohio, assignor to The B. F. Goodrich Company, New York, N. Y., a corporation of New York Application August 7, 1947, Serial No. 767,009

9 Claims. (Cl. 244—134)

1

The invention relates to the protection of distortable surfaces of rubber, especially from the deleterious effects of light rays, and is useful, for example, in the protection of inflatable rubber shoes on aircraft for ice-removal, and of tires and other inflatable or otherwise distortable articles of rubber of other rubber-like material ordinarily vulnerable to severe exposure to sunlight.

Materials and expedients proposed heretofore have not been fully satisfactory for such purposes in one or more respects. The protection of surfaces of rubber articles, especially the distensible surfaces of inflatable articles, against deterioration as from the effects of sunlight, weather and ozone has imposed requirements difficult to fulfill, especially as a coating applied to the surface must not hinder the normal expansible or distortable functions of the surface. The coating at the same time should be capable of protecting the surface against the effects of ultra-violet and infra-red rays and capable of resisting abrasion and stiffening and crazing with age and use. Desirably, it also should be capable of being applied to the surface as a thin uniform film and stripped from the surface intact by a simple peeling operation, and of being electrically conductive for conducting static electricity charges.

An object of the invention is to provide effectively for satisfying the foregoing and other requirements.

Other objects are to provide effectively for reflecting or blocking rays including the ultra-violet and infra-red rays of sunlight; to provide effectively for resistance to crazing, cracking, brittleness and other harmful deterioration from weather, air and ozone and other adverse exposure conditions; to provide for resistance to abrasion; to provide for flexibility, pliability and adequate elasticity; to provide for distinctiveness and stability of coloration; to provide for good attachment of the coating to the underlying surface while nevertheless providing for stripping or peeling the coating intact from the surface when it is desired to remove the same; to provide for convenience of manufacture and application of the coating to the surface; and to provide the foregoing and other results without substantial hindrance to the normally intended inflatable or distortable functions of the rubber being protected.

Further objects are to provide for effective protection of inflatable ice-removing shoes of aircraft under summer weather conditions without requiring removal of the shoes from the aircraft;

2 to provide for resisting abrasion of the shoes as from the blast of air of propellers; to provide for conducting static electricity from the shoes; to provide for protection of the shoes without objectionable hindrance to their operation under emergency conditions; and to provide for convenient and quick removal of the protection from the shoes by peeling the same intact without harm to the underlying surface thereof.

These and other objects and advantages of the invention will be apparent from the following description.

In the accompanying drawings, which form a part of this specification, and in which like numerals are employed to designate like parts throughout the same, Fig. 1 is a front perspective view from above showing protective coatings on rubber shoes of an aircraft wing and propeller and constructed in accordance with and embodying the invention, parts being broken away and in section, and Fig. 2 is a view like Fig. 1 on an enlarged scale showing the application of the coating to an inflatable shoe by a spraying operation, parts being broken away and in section.

The invention is applicable especially to the distortable surfaces of rubber covering structures for airfoils and other parts of aircraft such, for example, as inflatable shoes for ice-removal and rubber shoes for the leading edges of propellers and other airfoils.

In the illustrative construction shown in the drawings, extensible protective coatings or layers 5, 5 having properties and characteristics herein discussed are provided on the distensible outer surfaces 6, 7 of inflatable coverings or shoes 8, 9 of an aircraft wing 10 and to the distortable outer surfaces of protective shoes 11, 12, 13 of propeller blades 14, 15, 16.

The inflatable shoes are mounted on the leading edge of the wing 10 at each side of an engine nacelle 17 having a propeller 18. Each shoe 8, 9 includes a cover of resilient rubber or other rubber-like material 19, which cover encloses a plurality of inflatable tubes 20, 20 and may be attached along its margins 21, 22 to the skin surface of the wing. The tubes are adapted to be inflated to distend the distensible outer surface 6 of said rubber-like material for changing the outer surface contour to break up accumulated ice, in a manner, for example, as disclosed in the W. C. Geer Patent No. 1,998,809 of April 23, 1935.

Each protective shoe 11, 12, 13 includes a cover having a distortable outer surface of suitable rubber material, which cover may be adhesively mounted on the leading edge of the propeller blade 14, 15, 16 for resisting abrasion of the latter from foreign material such, for example, as sand and hail stones in the ambient air, in which action the resilient distortability of the rubber contributes to its effectiveness.

The rubber-like material of the outer surfaces of all these shoes is generally black in color with poor resistance to the action of sunlight and tends to become less resilient and to crack and otherwise deteriorate objectionably under the action of sunlight, ozone, air and weather and other conditions to which the shoes are ordinarily subjected during year around operations of the aircraft. The invention provides for protection of these surfaces against deterioration under these conditions.

The protective layer 5 constitutes a film or coating deposited on the distortable surface directly from a liquid dispersion, preferably a water dispersion, of a plasticized water-insoluble vinyl resin composition such, for example, as polyvinyl butyral, polyvinyl acetal, polyvinyl chloride, a mixture of polyvinyl chloride and polyethyl acrylate, or mixtures of these, containing discrete particles, preferably in flake form, having the property of good reflectivity of the rays of sunlight, which particles may be flakes of aluminum or other suitable metallic material such as copper or magnesium, or flakes of graphite or of mica, or mixtures of the flakes. Suitable plasticizers for the purpose include tricresyl phosphate, dibutyl phthalate and dioctyl phthalate. To assist in maintaining the state of suspension, a dispersing agent such as a suitable soap may be included, and the dispersion may also contain a suitable stabilizer such as ammonium hydroxide.

By way of example, good results have been obtained by the use of an aqueous dispersion containing about 42% of resin solids and having a viscosity of 30, to which has been added flakes of aluminum in the amount of about 2 or 3 parts by weight of the dispersion. Aluminum flakes of particle sizes within the range of 10 microns minimum to 200 microns maximum have been effective for the purpose herein. Good results have also been obtained with a mixture of mica and graphite flakes. Mica flakes of a specific gravity of 3 and having particle sizes of 5 to 200 microns are mixed with graphite flakes having particle sizes of 1 to 100 microns. The aluminum flakes or the mixture of flakes are introduced into the aqueous dispersion by mechanical mixing.

The flakes have the advantageous property, in addition to providing light reflection, of becoming arranged in an overlapping, shingled relation one to another to provide in the aggregate an extensive light-reflecting surface, in which extensive stretchability of the coating is nevertheless provided as a result of the ability of the flakes in their shingled relation to be moved back and forth relative to one another under distortion of the film. Moreover, with flakes having electrically conductive properties, such as aluminum or graphite flakes in the shingled relation in the layer, electrical conductivity for the removal of charges of static electricity is promoted.

The aqueous dispersion containing the flakes may be deposited in a uniform, thin layer which is effectively light-reflective and highly resistant to deterioration from sunlight, weather, ozone and oil, and which is further characterized by its stretchability, toughness, ability to remain intact in the peeling operation, and ability to flex and stretch with the rubber-like material without objectionable cracking and crazing.

The aqueous dispersion with its contained flakes of light-reflective material is applied to the distortable surface, after the latter has been vulcanized, or otherwise treated to its finished condition, and may be applied by brushing or desirably by spraying upon the underlying rubber-like material. The spraying may be effected by suitable spray apparatus including a spray gun 23 and conduits 24, 25 connected to a supply of the aqueous dispersion and to a source of air under pressure. The spraying may be done prior to installation of the shoes or after the shoes are installed on the aircraft.

The following illustrative procedure has been found to provide a suitably thin coating of uniform thickness having the desired light-reflective properties, strength and peelability together with effective strength of attachment of the coating or layer to the distortable surface. The shoe in the installed condition, for example, on the leading edge of the wing, as shown especially in Fig. 2, is first washed with gasoline, carbon tetrachloride or other suitable cleaning agent to remove thoroughly any oil, dirt and other objectionable foreign matter from the rubber-like material of the distortable surface 6. Any metal or other parts of the shoe that are not required to be protected by the layer 5 may then be masked as by masking tape. Upon the clean distortable surface 6 is deposited the layer 5, preferably by spraying, to provide a thin coating of uniform thickness. This coating or layer may be built up to the desired thickness by applying successive coatings, permitting each coat to dry at least partially before the succeeding coat or coats are applied.

Good results have been obtained by three coats of the dispersion resulting in a layer 5 of approximately 0.007 inch thickness which has been found to be sufficient for blocking ultra-violet and infra-red rays and other rays of sunlight and for facilitating the operation of peeling the layer intact from the shoe. Thicknesses of the layer 5 not exceeding 0.020 inch have afforded effective protection without objectionable resistance to the distention of the inflatable shoe. Even though the layer is attached in adhered relation to the surface, the layer is readily removed, when desired, by peeling the same substantially intact from the surface without harm to the latter and this avoids the necessity of using expedients such as abrasives and buffing tools for removing coatings.

The inflatable shoes of a commercial transport airplane, for example, may be sprayed with the dispersion for full protection, especially during the summer, by a spraying operation requiring about one hour or so to complete. The resulting layers may be stripped from the shoes by a peeling operation requiring a comparably short period of time. It has been customary heretofore to remove the shoes from the airplane during the summer and re-install the shoes in the fall of the year. The installation and removal of the shoes generally has required considerable time and effort. The invention thus advantageously saves substantial valuable time in the maintenance of aircraft in commercial and military use, in addition to facilitating storage of the aircraft in the open spaces of airfields without undue sacrifice of life of the rubber structures of the aircraft.

This storage feature is of particular value to military air services with respect to the storage of airplanes for standby or emergency usage.

Since the shoes are generally of black rubber-like material compounds, the silvery color and sheen of the layer 5 affords a distinctive indicator of its presence on the shoes so that the operator of the aircraft is conscious of the protected condition of the shoes during flight or storage of the aircraft. Thus, there is no question whether the protective layer has or has not been removed as for winter flight usage of the shoes.

Variations may be made without departing from the scope of the invention as it is hereinafter claimed.

I claim:

1. An article of the class described adapted to be extensively distorted in the use thereof comprising a surface of distortable material and a light-reflective temporary protective layer thereon in adhered relation thereto but removable therefrom while leaving said surface intact by peeling of the layer from said surface, said layer being extensible to accommodate distortion of said surface and constituting a deposit on said surface directly from a liquid dispersion of a water-insoluble vinyl resin composition containing discrete particles of a material presenting light-reflective faces, said layer having a substantial quantity of said particles in light-reflecting disposition and said layer being characterized by its high degree of resistance to the action of sunlight and weather and its stretchability, toughness and ability to remain intact in the peeling operation.

2. An article of the class described adapted to be extensively stretched in the use thereof comprising a surface of resilient stretchable material and a light-reflective temporary protective layer thereon in adhered relation thereto but removable therefrom while leaving said surface intact by peeling of the layer from said surface, said layer being extensible to accommodate stretching of said surface and constituted by a deposit on said surface directly from an aqueous dispersion of a water-insoluble vinyl resin composition containing discrete particles of a material presenting light-reflective faces, said layer having a substantial quantity of said particles in light-reflecting disposition and in overlapping shingled relation in said layer, said layer being characterized by its high degree of resistance to the action of sunlight and weather and its stretchability, toughness and ability to remain intact in the peeling operation.

3. An article of the class described adapted to be extensively distended in the use thereof comprising a surface of resilient rubber-like material and a light-reflective temporary protective layer thereon in adhered relation thereto but removable therefrom while leaving said surface intact by peeling of the layer from said surface, said layer being extensible to accommodate distension of said surface and constituted by a deposit on said surface directly from an aqueous dispersion of a water-insoluble vinyl resin composition containing flakes of a material presenting light-reflective faces, said layer having a substantial quantity of said flakes in light-reflecting disposition and in overlapping shingled relation in said layer, said layer being characterized by its high degree of resistance to the action of sunlight and weather and its stretchability, toughness and ability to remain intact in the peeling operation.

4. An article of the class described adapted to be distorted in the use thereof comprising a surface of distortable rubber-like material and a light-reflective temporary protective layer thereon in adhered relation thereto but removable therefrom without harm to said surface by peeling of the layer from said surface, said layer being extensible to accommodate distortion of said surface and constituting a deposit on said surface directly from an aqueous dispersion of a water-insoluble vinyl resin composition capable of drying to form a continuous film of substantially uniform thickness at atmospheric temperatures and containing flakes of metallic material presenting light-reflective faces, said layer having a substantial quantity of said flakes in light-reflecting disposition and in overlapping shingled relation in said layer, said layer being characterized by its high degree of resistance to the action of sunlight and weather and its stretchability, toughness and integrity in the peeling operation.

5. An article of the class described adapted to be distorted in the use thereof comprising a surface of distortable rubber-like material and a light-reflective temporary protective layer thereon in adhered relation thereto but removable therefrom without harm to said surface by peeling of the layer from said surface, said layer being extensible to accommodate distortion of said surface and constituting a deposit on said surface directly from an aqueous dispersion of a water-insoluble vinyl resin composition capable of drying to form a continuous film of substantially uniform thickness at atmospheric temperatures and containing flakes of graphite and of mica material presenting light-reflective faces, said layer having a substantial quantity of said flakes in light-reflecting disposition and in overlapping shingled relation in said layer, said layer being characterized by its high degree of resistance to the action of sunlight and weather and its stretchability, toughness and integrity in the peeling operation.

6. Ice-removing apparatus for aircraft including an inflatable covering comprising a distensible surface of resilient rubber-like material, inflatable means for distending said surface, and a light-reflective temporary protective layer on said surface in adhered relation thereto but readily removable therefrom while leaving said surface intact by peeling of the layer from said surface, said layer being extensible to accommodate the distension of said surface under the inflation and constituting a deposit directly on said surface from an aqueous dispersion of a water-insoluble vinyl resin composition containing flakes of a material presenting light-reflective faces, said layer having a substantial quantity of said flakes in light-reflecting disposition and in an overlapping shingled relation in said layer, said layer being characterized by its high degree of resistance to the action of sunlight and weather and its stretchability, toughness and ability to remain intact in the peeling operation.

7. Ice-removing apparatus for aircraft including an inflatable covering comprising a distensible surface of resilient rubber-like material, inflatable means for distending said surface, and a light-reflective temporary protective layer on said surface in adhered relation thereto but readily removable therefrom while leaving said surface intact by peeling of the layer from said surface, said layer being extensible to accommodate the distension of said surface under the inflation and constituting a deposit directly on said surface from an aqueous dispersion of a water-insoluble vinyl resin composition containing flakes of an electrically conductive material presenting light-reflective faces, said layer having a substantial quantity of said flakes in light-reflecting disposition and in an overlapping shingled relation in said layer, said layer being characterized by its high degree of resistance to the action of sunlight and weather and its stretchability, toughness and ability to remain intact in the peeling operation.

8. Ice-removing apparatus for aircraft including an inflatable covering comprising a distensible surface of resilient rubber-like material, inflatable means for distending said surface, and a light-reflective temporary protective layer on said surface in adhered relation thereto but readily removable therefrom while leaving said surface intact by peeling of the layer from said surface, said layer being extensible to accommodate the distension of said surface under the inflation and constituting a deposit directly on said surface from an aqueous dispersion of a water-insoluble vinyl resin composition capable of drying to form a continuous film of substantially uniform thickness at atmospheric temperatures and containing flakes of aluminum material presenting light-reflective faces, said layer having a substantial quantity of said flakes in light-reflecting disposition and in an overlapping shingled relation in said layer, said layer being characterized by its high degree of resistance to the action of sunlight and weather and its stretchability, toughness and ability to remain intact in the peeling operation.

9. Ice-removing apparatus for aircraft including an inflatable covering comprising a distensible surface of resilient rubber-like material, inflatable means for distending said surface, and a light-reflective temporary protective layer on said surface in adhered relation thereto but readily removable therefrom while leaving said surface intact by peeling of the layer from said surface, said layer being extensible to accommodate the distension of said surface under the inflation and constituting a deposit directly on said surface from an aqueous dispersion of a water-insoluble vinyl resin composition capable of drying to form a continuous film of substantially uniform thickness at atmospheric temperatures and containing flakes of graphite and of mica material presenting light-reflective faces, said layer having a substantial quantity of said flakes in light-reflecting disposition and in an overlapping shingled relation in said layer, said layer being characterized by its high degree of resistance to the action of sunlight and weather and its stretchability, toughness and ability to remain intact in the peeling operation.

ALVIN W. SPICER.

REFERENCES CITED

The following references are of record in the file of this patent:

UNITED STATES PATENTS

| Number | Name | Date |
|---|---|---|
| 1,998,809 | Geer | Apr. 23, 1935 |
| 2,215,340 | Vasen | Sept. 17, 1940 |
| 2,237,175 | Colley | Apr. 1, 1941 |
| 2,290,794 | Alvardo et al. | July 21, 1942 |
| 2,411,470 | Shaw | Nov. 19, 1946 |
| 2,471,224 | Loughborough | May 24, 1949 |